United States Patent
Song et al.

(10) Patent No.: US 10,114,587 B2
(45) Date of Patent: Oct. 30, 2018

(54) MEMORY DEVICE USING EXTRA READ AND WRITE COMMANDS

(71) Applicant: SK hynix Inc., Gyeonggi-do (KR)

(72) Inventors: Young-Ook Song, Gyeonggi-do (KR);
Ki-Joong Kim, Gyeonggi-do (KR);
Jung-Hyun Kwon, Gyeonggi-do (KR);
Yong-Ju Kim, Gyeonggi-do (KR)

(73) Assignee: SK Hynix Inc., Gyeonggi-do (KR)

(*) Notice: Subject to any disclaimer, the term of this patent is extended or adjusted under 35 U.S.C. 154(b) by 201 days.

(21) Appl. No.: 15/148,911

(22) Filed: May 6, 2016

(65) Prior Publication Data

US 2017/0185352 A1    Jun. 29, 2017

(30) Foreign Application Priority Data

Dec. 23, 2015   (KR) .................. 10-2015-0184927

(51) Int. Cl.
  *G06F 3/06*    (2006.01)
  *G06F 13/16*   (2006.01)
  *G06F 13/00*   (2006.01)

(52) U.S. Cl.
  CPC .......... *G06F 3/0659* (2013.01); *G06F 3/0613* (2013.01); *G06F 3/0647* (2013.01); *G06F 3/0673* (2013.01); *G06F 13/1657* (2013.01); *G06F 13/1684* (2013.01); *G06F 13/00* (2013.01)

(58) Field of Classification Search
  CPC .............................. G06F 3/0659; G06F 13/00
  See application file for complete search history.

(56) References Cited

U.S. PATENT DOCUMENTS

| | | | |
|---|---|---|---|
| 9,147,672 B1* | 9/2015 | Chen | H01L 25/18 |
| 9,384,785 B2* | 7/2016 | Confalonieri | G11C 5/14 |
| 2006/0220703 A1 | 10/2006 | Wang et al. | |
| 2011/0041007 A1* | 2/2011 | Huang | G06F 3/061 |
| | | | 714/15 |
| 2014/0241024 A1* | 8/2014 | Kim | G11C 5/063 |
| | | | 365/63 |

FOREIGN PATENT DOCUMENTS

KR    1020100041390    4/2010

* cited by examiner

*Primary Examiner* — Charles Rones
*Assistant Examiner* — Tian-Pong Chang
(74) *Attorney, Agent, or Firm* — IP & T GROUP LLP (57) ABSTRACT

A memory device may include one or more multi-channel memories and an interface unit suitable for interfacing the multi-channel memories. The interface unit may include a first data interface suitable for transferring data for the first channel of the multi-channel memories, a second data interface suitable for transferring data for the second channel of the multi-channel memories, and an extra data interface suitable for transferring data for a selected one of the first channel and the second channel so that the data is additionally transmitted.

13 Claims, 6 Drawing Sheets

MEMORY DEVICE USING EXTRA READ AND WRITE COMMANDS

CROSS-REFERENCE TO RELATED APPLICATION(S)

The present application claims priority of Korean Patent Application No. 10-2015-0184927, filed on Dec. 23, 2015, which is incorporated herein by reference in its entirety.

BACKGROUND

1. Field

Exemplary embodiments of the present invention relate to a memory device, and more particularly, to a technology for improving the bandwidth of a memory device.

2. Description of the Related Art

Recently, both the capacity and speed of a semiconductor memory used as a storage device in most of electronic systems have tended to increase. Furthermore, various attempts are being made to mount memory having a higher capacity within a narrower area and to efficiently drive memory.

Furthermore, to improve the degree of integration of pieces of memory, a three-dimensional (3D) stack technology in which a plurality of memory chips are stacked, is being applied instead of an existing two-dimensional (2D) arrangement. In accordance with the requirements of higher-integration and higher-capacity memory, a structure for improving the degree of integration by reducing the size of a semiconductor chip using the 3D stack structure of memory chips as well as increasing the capacity has been developed.

Figure 1:
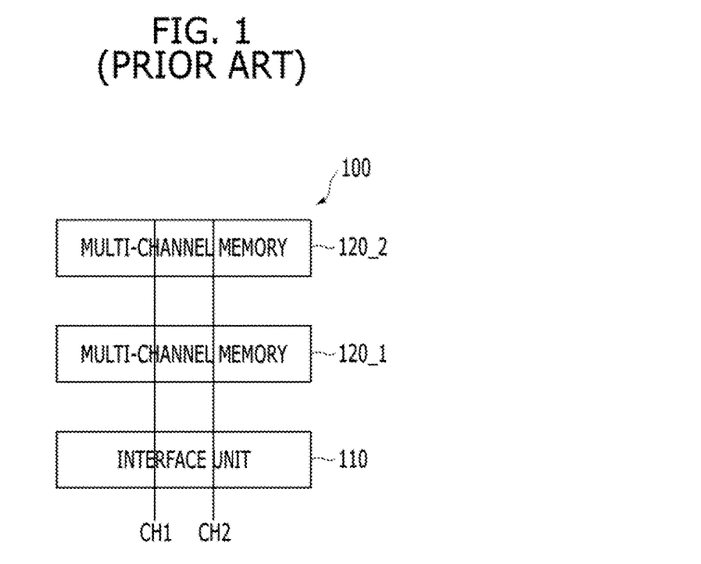
FIG. 1 is a diagram illustrating the configuration of a conventional memory device.

FIG. 1 is a diagram illustrating the configuration of conventional memory device.

Referring to FIG. 1, the memory device 100 may include a plurality of multi-channel memories 120_1 and 120_2 and an interface unit 110.

The multi-channel memories 120_1 and 120_2 can support a multi-channel operation. A first channel CH1 and a second channel CH2 have independent command buses, address buses, and data buses and may operate independently. FIG. 1 represents the command bus, address bus, and data bus of the first and second channels CH1 and CH2 with respective single lines.

The interface unit 110 may function as an interface between the multi-channel memories 120_1 and 120_2 and a device outside the memory device such as, a memory controller or a GPU and CPU including a memory controller.

SUMMARY

Various embodiments are directed to a memory device with improved bandwidth.

In an embodiment, a memory device may include one or more multi-channel memories and an interface unit suitable for interfacing with the multi-channel memories. The interface unit may include a first data interface suitable for transferring data for the first channel of the multi-channel memories, a second data interface suitable for transferring data for the second channel of the multi-channel memories, and an extra data interface suitable for transferring data for a selected one of the first channel and the second channel so that the data is additionally transmitted.

When an extra read command for the first channel is applied, data read from the first channel of the multi-channel memories may be output through the first data interface and the extra data interface. When an extra read command for the second channel is applied, data read from the second channel of the multi-channel memories may be output through the second data interface and the extra data interface.

When the extra read command for the first channel is applied, the data output through the first data interface and the data output through the extra data interface may be different. When the extra read command for the second channel is applied, the data output through the second data interface and the data output through the extra data interface may be different.

When an extra write command for the first channel is applied, data inputted through the first data interface and the extra data interface may be written in the first channel of the multi-channel memories. When an extra write command for the second channel is applied, data inputted through the second data interface and the extra data interface may be written in the second channel of the multi-channel memories.

When the extra write command for the first channel is applied, the data inputted through the first data interface and the data inputted through the extra data interface may be different. When the extra write command for the second channel is applied, the data inputted through the second data interface and the data inputted through the extra data interface may be different.

The interface unit may further include a first command interface suitable for receiving a command for the first channel, a second command interface suitable for receiving a command for the second channel, a first address interface suitable for receiving an address for the first channel, and a second address interface suitable for receiving an address for the second channel.

The multi-channel memories may be stacked over the interface unit.

In an embodiment, a memory device may include one or re multi-channel memories and an interface unit suitable for interfacing the multi-channel memories. The interface unit may include a first data interface suitable for transferring data for the first channel of the multi-channel memories and a second data interface suitable for transferring data for the second channel of the multi-channel memories, both the first data interface and the second data interface may function as an interface with data of the first channel when the first channel is additionally selected for extra transmission, and both the first data interface and the second data interface may function as an interface with data of the second channel when the second channel is additionally selected for extra transmission.

When an extra read command for the first channel is applied, data read from the first channel of the mufti-channel memories may be output through the first data interface and the second data interface. When an extra read command for the second channel is applied, data read from the second channel of the multi-channel memories may be output through the first data interface and the second data interface.

When the extra read command for the first channel is applied, the data output through the first data interface and the data output through the second data interface may be different. When the extra read command for the second channel is applied, the data output through the first data interface and the data output through the second data interface may be different.

When an extra write command for the first channel is applied, data inputted through the first data interface and the second data interface may be written in the first channel of the multi-channel memories. When an extra write command for the second channel is applied, data inputted through the first data interface and the second data interface may be written in the second channel of the multi-channel memories.

When the extra write command for the first channel is applied, the data inputted through the first data interface and the data inputted through the second data interface may be different. When the extra write command for the second channel is applied, the data inputted through the first data interface and the data inputted through the second data interface may be different.

The interface unit may further include a first command interface suitable for receiving a command for the first channel, a second command interface suitable for receiving a command for the second channel a first address interface suitable for receiving an address for the first channel, and a second address interface suitable for receiving an address for the second channel.

The multi-channel memories may be stacked over the interface unit.

DETAILED DESCRIPTION

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 2:
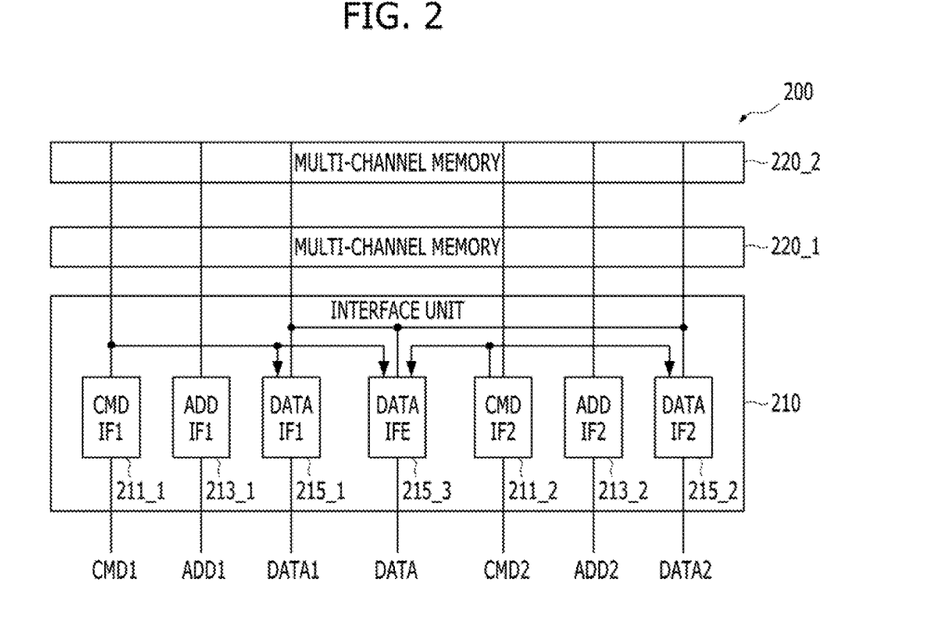
FIG. 2 is a diagram illustrating the configuration of a memory device in accordance with an embodiment of the present invention.

FIG. 2 is a diagram illustrating the configuration of a memory device in accordance with an embodiment of the present invention.

Referring to FIG. 2, the memory device 200 may include an interface unit 210 and multi-channel memories 220_1 and 220_2.

The multi-channel memories 220_1 and 220_2 can support a multi-channel operation. A first channel and a second channel may receive independent commands and addresses from devices outside the memory device 200 such as, a memory controller and a CPU, and GPU including a memory controller, and may independently exchange data.

The interface unit 210 may function as an interface between the multi-channel memories 220_1 and 220_2 and the device outside the memory device 200. The interface unit 210 may include a first command interface 211_1, a first address interface 213_1, a first data interface 215_1, a second command interface 211_2, a second address interface 213_2, a second data interface 215_2, and an extra data interface 215_3.

The first command interface 211_1, may transfer a command CMD1 from the external device to the first channel of the multi-channel memories 220_1 and 220_2. The command CMD1 may include active, precharge, read, write, and refresh commands. Furthermore, the command CMD1 may further include an extra read command and an extra write command for increasing the bandwidth of the first channel. When the extra read command and the extra write command are applied to the first command interface 211_1, a scheme of inputting/outputting data through the interface unit 210 is changed. Accordingly, the first command interface 211_1 may notify the first data interface 215_1 and the extra data interface 215_3 whether the extra read command and the extra write command are applied.

The first address interface 213_1 may transfer an address ADD1 from the external device to the first channel of the multi-channel memories 220_1 and 220_2.

The first data interface 215_1 may transfer data between the external device and the first channel of the multi-channel memories 220_1 and 220_2. During the write operation, the first data interface 215_1 may transfer data DATA1 from the external device to the first channel of the multi-channel memories 220_1 and 220_2. During the read operation, the first data interface 215_1 may transfer read data from the first channel of the multi-channel memories 220_1 and 220_2 to the external device.

The second command interface 211_2 may transfer a command CMD2 from the external device to the second channel of the multi-channel memories 220_1 and 220_2. The command CMD2 may include active, precharge, read, write, and refresh commands. Furthermore, the command CMD2 may further include the extra read command and the extra write command for increasing the bandwidth of the second channel. When the extra read command and an extra write command are applied to the second command interface 211_2, a scheme for inputting/outputting data through the interface unit 210 is changed. Accordingly, the second command interface 211_2 may notify the second data interface 215_2 and the extra data interface 215_3 whether or not an extra read command and an extra write command are applied.

The second address interface 213_2 may transfer an address ADD2 from the external device to the second channel of the multi-channel memories 220_1 and 220_2.

The second data interface 215_2 may transfer data between the external device and the second channel of the multi-channel memories 220_1 and 220_2. During the write operation, the second data interface 215_2 may transfer data DATA2 from the external device to the second channel of the multi-channel memories 220_1 and 220_2, During the read operation, the second data interface 215_2 may transfer read data from the second channel of the multi-channel memories 220_1 and 220_2 to the external device.

The extra data interface 215_3 may operate in response to the extra read command or the extra write command.

Upon application of the extra read command for the first channel, both of the first data interface 215_1 and the extra data interface 215_3 may transfer the read data from the first channel of the multi-channel memories 220_1 and 220_2 to the external device. Upon application of the extra write command for the first channel, both of the first data interface 215_1 and the extra data interface 215_3 may transfer data DATA1 from the external device to the first channel of the multi-channel memories 220_1 and 220_2.

Upon application of the extra read command for the second channel, both of the second data interface 215_2 and the extra data interface 215_3 may transfer the read data from the second channel of the multi-channel memories 220_1 and 220_2 to the external device. Upon application of the extra write command for the second channel, both of the second data interface 215_2 and the extra data interface 215_3 may transfer data DATA2 from the external device to the second channel of the multi-channel memories 220_1 and 220_2.

As described above, when the extra data interface 215_3 is used, the number of interfaces for sending and receiving data is increased. Accordingly, performance can be increased since the bandwidth of the memory device 200 is increased.

Each of the multi-channel memories 220_1 and 220_2 may be formed using one chip, and the interface unit 210 may also be formed using one chip. Furthermore, the multi-channel memories 220_1 and 220_2 may be stacked over the interface unit 210. The interface unit 210 may also be called a base die or a logic die, and each of the multi-channel memories 220_1 and 220_2 may also be called a memory die.

In FIG. 2, the memory device 200 has been illustrated as including the two multi-channel memories 220_1 and 220_2, but the number of multi-channel memories 220_1 and 220_2 included in the memory device 200 may vary. Furthermore, in FIG. 2, the multi-channel memories 220_1 and 220_2 have been illustrated as supporting a 2-channel operation, but the multi-channel memories 220_1 and 220_2 may support an operation for a multiple number of channels exceeding 2. Furthermore, one line shown in FIG. 2 may include a plurality of lines. For example, the first command interface 211_1 may receive the command CMD1 using a plurality of pads or lines, and transfer the received command CMD1 to the multi-channel memories 220_1 and 220_2 using a plurality of lines. The same is true of the other interfaces 211_2, 213_1, 213_2, 215_1, 215_2, and 215_3.

Figure 3:
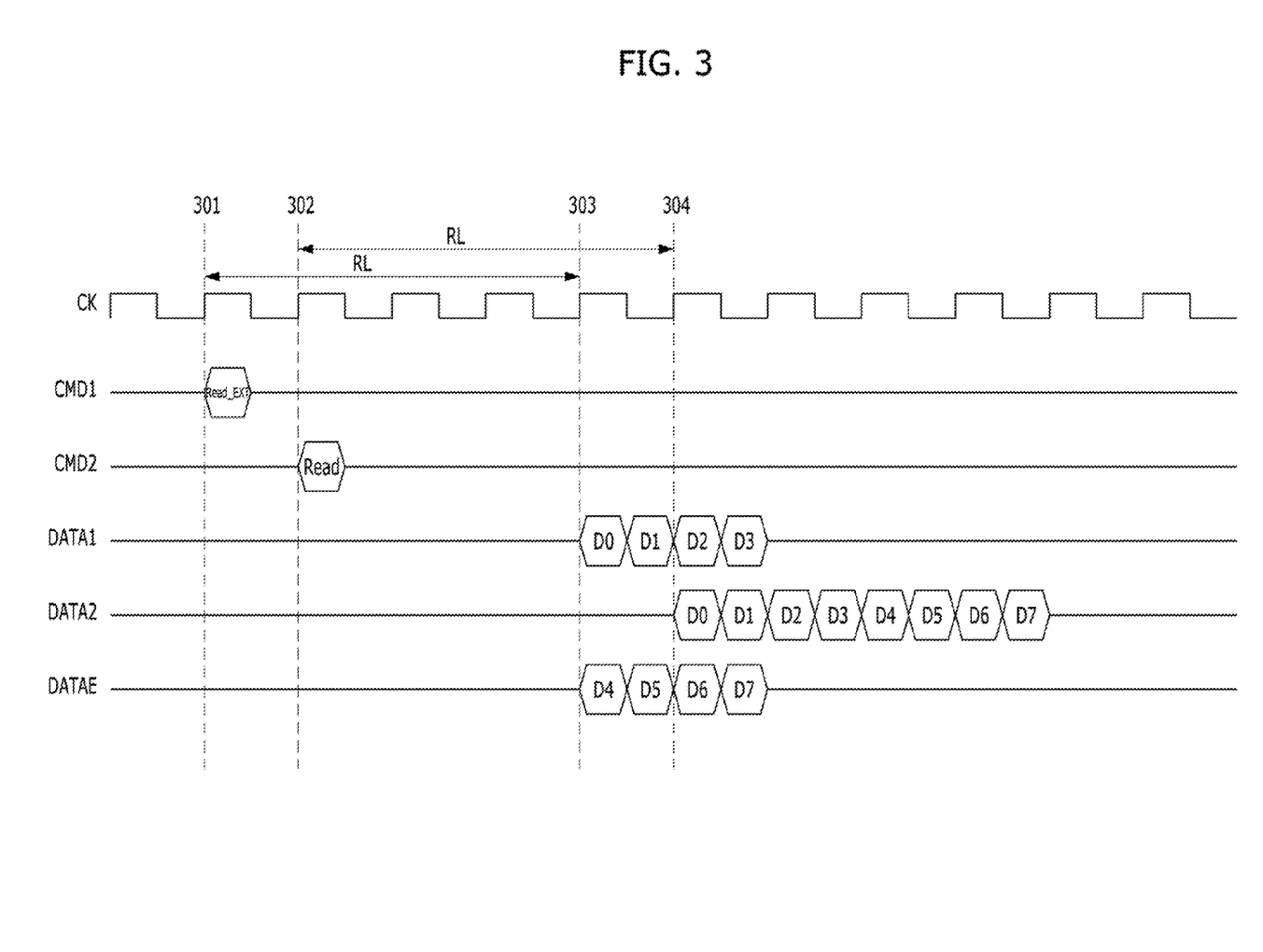
FIG. 3 is a diagram illustrating a read operation of the memory device of FIG. 2.

FIG. 3 is a diagram illustrating the read operation of the memory device 200.

Referring to FIG. 3, at a point in time 301 the extra read command Read_EXT for the first channel may be applied through the first command interface 211_1. Furthermore, at a point in time 303 after a lapse of read latency RL from the point in time 301, data D0~D7 of the read data DATA1 and DATAE, transferred from the first channel may be output through both of the first data interface 215_1 and the extra data interface 215_3, respectively. If the data D0~D7 were output through only the first data interface 215_1, a cycle of 4 clocks would be consumed in outputting the data D0~D7 based on a clock CK. It may be seen from FIG. 3 that only a cycle of two clocks is consumed in outputting the data D0~D7 since the data D0~D7 is output through both of the first data interface 215_1 and the extra data interface 215_3. In FIG. 3, the first data interface 215_1 has been illustrated as outputting the data D0~D3 and the extra data interface 215_3 has been illustrated as outputting the data D4~D7. However, data output by the data interfaces 215_1 and 215_3 may be changed when the even data D0, D2, D4, and D6 is output through the first data interface 215_1 and the odd data D1, D3, D5, and D7 is output through the extra data interface 215_3.

At a point in time 302, the read command Read for the second channel may be applied through the second command interface 211_2. Furthermore, at a point in time 304 after a lapse of the read latency RL from the point in time 302, data D0~D7 of DATA2 may be output through the second data interface. Accordingly, it may be seen that a cycle of 4 clocks is consumed in outputting the data D0~D7 since the data D0~D7 is output only through the second data interface 215_2.

The address ADD1 may be applied through the first address interface 213_1 while the extra read command Read_EXT is applied through the first command interface 211_1 at the point in time 301, and the address ADD2 may be applied through the second address interface 213_2 while the read command Read is applied through the second command interface 211_2 at the point in time 303, but the applications of the address ADD1 and the address ADD2 have not been shown in FIG. 3. Addresses applied along with commands are not shown in the following drawings.

Figure 4:
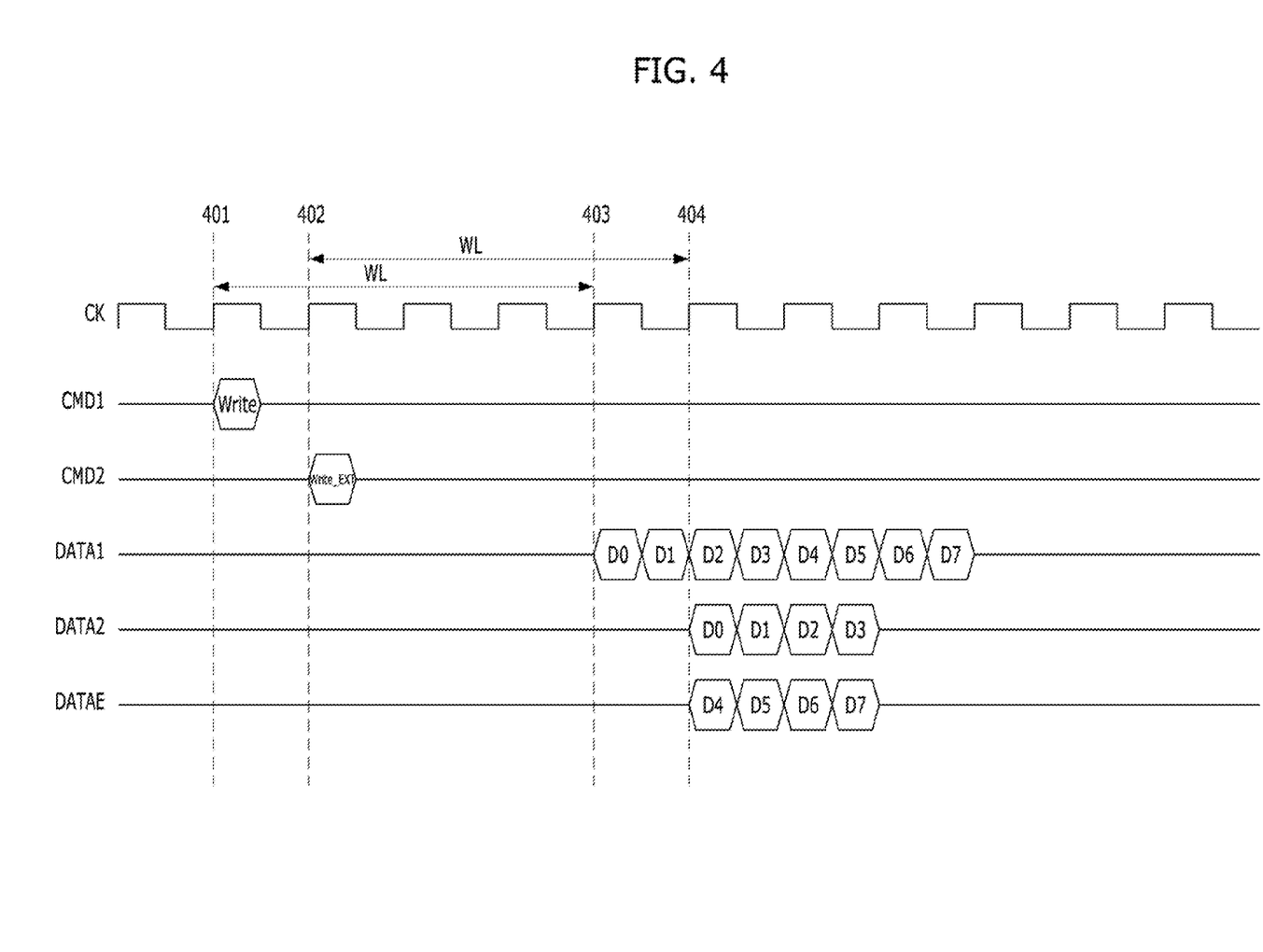
FIG. 4 is a diagram illustrating a write operation of the memory device of FIG. 2.

FIG. 4 is a diagram illustrating the write operation of the memory device 200.

Referring to FIG. 4, at a point in time 401 the write command Write for the first channel may be applied through the first command interface 211_1. Furthermore, at a point in time 403 after a lapse of write latency WL from the point in time 401, data D0~D7 of the write data DATA1 may be inputted from the external device to the memory device 200 only through the first data interface 215_1. It may be seen in FIG. 4 that a cycle of 4 clocks is consumed in inputting the data D0~D7 since the data D0~D7 written in the first channel of the memory device 200 is inputted only through the first data interface 215_1.

At a point in time 402, the extra write command Write_EXT for the second channel may be applied through the second command interface 211_2. Furthermore at a point in time 404 after a lapse of the write latency WL from the point in time 402, data D0~D7 of the write data DATA2 and DATAE transferred from the external device may be inputted to the memory device 200 through both of the second data interface 215_2 and the extra data interface 215_3, respectively. It may be seen that a cycle of 2 clocks is consumed in inputting the data D0~D7 to be written in the second channel of the memory device 200 since the data D0~D7 is inputted through both of the second data interface 215_2 and the extra data interface 215_3.

From FIGS. 3 and 4, it may be seen that when the extra read command Read_EXT and the extra write command Write_EXT are applied, the amount of data that is simultaneously inputted/outputted can be increased since the extra data interface 215_3 is additionally used and thus the bandwidth of the memory device 200 can be increased.

Figure 5:
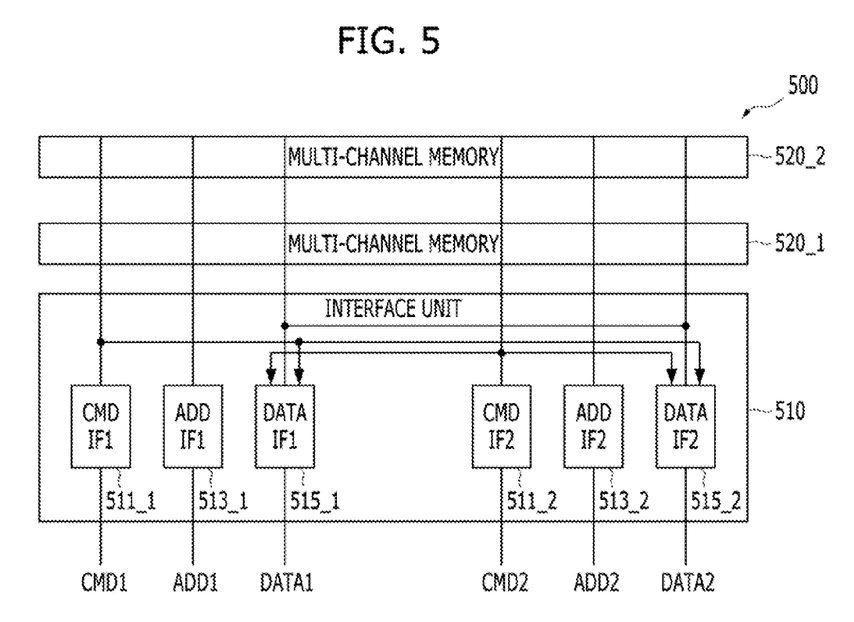
FIG. 5 is a diagram illustrating the configuration of a memory device in accordance with another embodiment of the present invention.

FIG. 5 is a diagram illustrating the configuration of a memory device in accordance with another embodiment of the present invention.

Referring to FIG. 5, the memory device 500 may include an interface unit 510 and multi-channel memories 520_1 and 520_2.

The multi-channel memories 520_1 and 520_2 can support a multi-channel operation. A first channel and a second channel may receive independent commands and addresses from devices outside the memory device 500 such as, a memory controller and a CPU and GPU including a memory controller, and may independently exchange data.

The interface unit 510 may function as an interface between the multi-channel memories 520_1 and 520_2 and the device outside the memory device 500. The interface unit 510 may include a first command interface 511_1, a first address interface 513_1, a first data interface 515_1, a second command interface 511_2, a second address interface 513_2, and a second data interface 515_2.

The first command interface 511_1 may transfer a command CMD1 from the external device to the first channel of the multi-channel memories 520_1 and 520_2. The command CMD1 may include active, precharge, read, write, and refresh commands. Furthermore, the command CMD1 may further include an extra read command and an extra write command for increasing the bandwidth of the first channel. When an extra read command and an extra write command are applied to the first command interface 511_1, a scheme of inputting/outputting data through the interface unit 510 is changed. Accordingly, the first command interface 511_1 may notify the first data interface 515_1 and the second data Interface 215_2 whether or not an extra read command and an extra write command are applied.

The first address interface 513_1 may transfer an address ADD1 from the external device to the first channel of the multi-channel memories 520_1 and 520_2.

The first data interface 515_1 may transfer data between the external device and the first channel of the multi-channel memories 520_1 and 520_2. During the write operation, the first data interface 515_1 may transfer data DATA1 from the external device to the first channel of the multi-channel memories 520_1 and 520_2. During the read operation, the first data interface 515_1 may transfer read data from the first channel of the multi-channel memories 520_1 and 520_2 to the external device. Furthermore, when the extra read command and extra write command for the second channel are applied to the second command interface 511_2, the first data interface 515_1 may transfer data between the second channel and the external device along with the second data interface 515_2.

The second command interface 511_2 may transfer a command CMD2 from the external device to the second channel of the multi-channel memories 520_1 and 520_2. The command CMD2 may include active, precharge, read, write, and refresh commands. Furthermore the command CMD2 may further include an extra read command and an extra write command for increasing the bandwidth of the second channel. When the extra read command and the extra write command are applied to the second command interface 511_2, a scheme of inputting/outputting data through the interface unit 510 is changed. Accordingly, the second command interface 511_2 may notify the second data interface 515_2 and the first data interface 515_1 whether or not an extra read command and an extra write command are applied.

The second address interface 513_2 may transfer an address ADD2 from the external device to the second channel of the multi-channel memories 520_1 and 520_2.

The second data interface 515_2 may transfer data between the external device and the second channel of the multi-channel memories 520_1 and 520_2. During the write operation, the second data interface 515_2 may transfer data DATA2 from the external device to the second channel of the multi-channel memories 520_1 and 520_2. During the read operation, the second data interface 515_2 may transfer read data from the second channel of the multi-channel memories 520_1 and 520_2 to the external device. Furthermore, when the extra read command and extra write command for the first channel are applied to the first command interface 511_1, the second data interface 515_2 may transfer data between the first channel and the external device along with the first data interface 515_1.

In the embodiment of FIG. 5, although the extra data interface 215_3 is not present as in the embodiment of FIG. 2, during the extra read operation or the extra write operation to the first channel, both of the first data interface 515_1 and the second data interface 515_2 may transfer the data between the first channel and the external device. During the extra read operation or the extra write operation to the second channel, both of the second data interface 515_2 and the first data interface 515_1 may transfer the data between the second channel and the external device. Accordingly, the bandwidth of the memory device 500 can be increased since the number of interfaces through which data is transmitted and received is increased.

Figure 6:
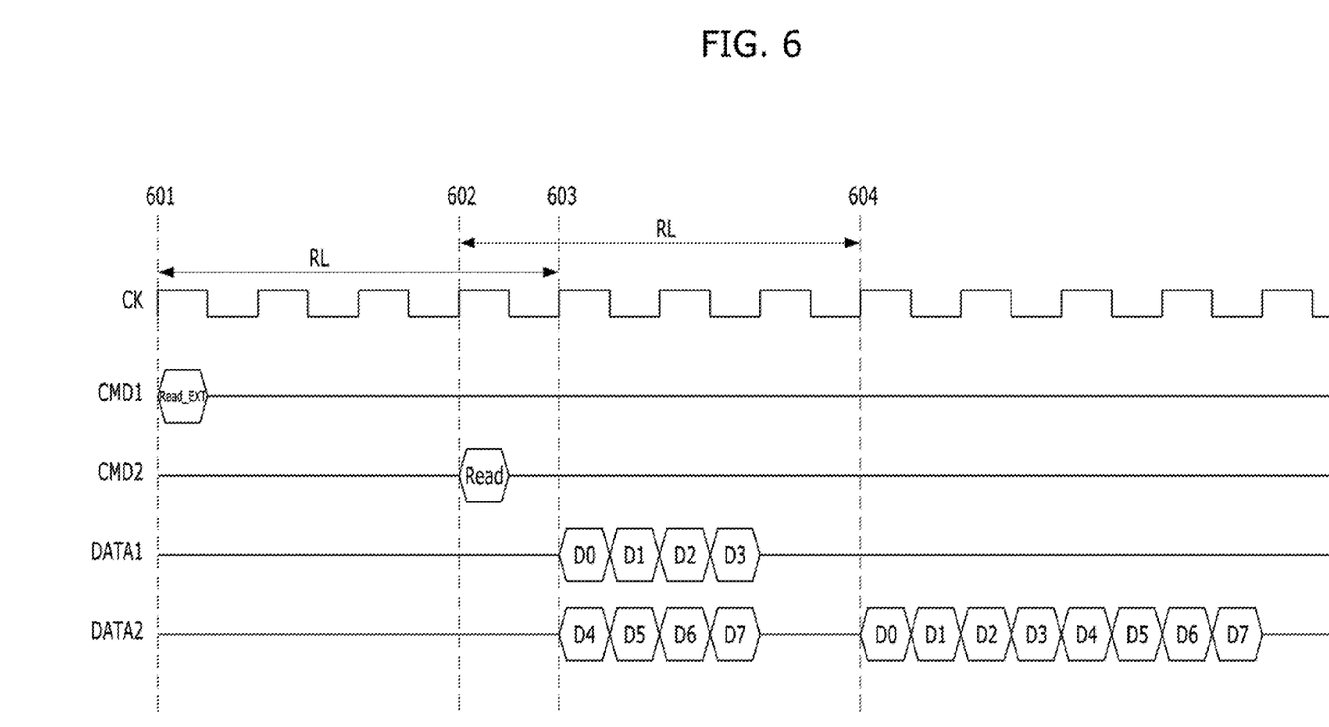
FIG. 6 is a diagram illustrating a read operation of the memory device of FIG. 5.

FIG. 6 is a diagram illustrating the read operation of the memory device 500.

Referring to FIG. 6, at a point in time 601, the extra read command Read_EXT for the first channel may be applied through the first command interface 511_1. Furthermore, at a point in time 603 after a lapse of read latency RL from the point in time 601, data D0~D7 of the read data DATA1 and DATA2 transferred from the first channel may be output through both of the first data interface 515_1 and the second data interface 515_2, respectively. It may be seen that only a cycle of 2 clocks is consumed in outputting the data D0~D7 since the data D0~D7 is output through both of the first data interface 515_1 and the second data interface 515_2.

At a point in time 602 the read command Read for the second channel may be applied through the second command interface 511_2. Furthermore, at a point in time 604 after a lapse of the read latency RL from the point in time 602, data D0~D7 of DATA2 may be output through the second data interface 515_2. It may be seen that a cycle of 4 clocks is consumed in outputting the data D0~D7 since the data D0~D7 is output only through the second data interface 515_2.

When the extra read command for the first channel is applied, the extra read operation for the first channel may be performed during the section in which the second data interface 515_2 is not used for the second channel since both of the first data interface 515_1 and the second data interface 515_2 are used at the same time in response to the extra read command for the first channel. Likewise, when the extra read command for the second channel is applied, the extra read operation for the second channel may be performed during the section in which the first data interface 515_1 is not used for the first channel since both of the second data interface 515_2 and the first data interface 515_1 are used at the same time in response to the extra read command for the second channel.

Figure 7:
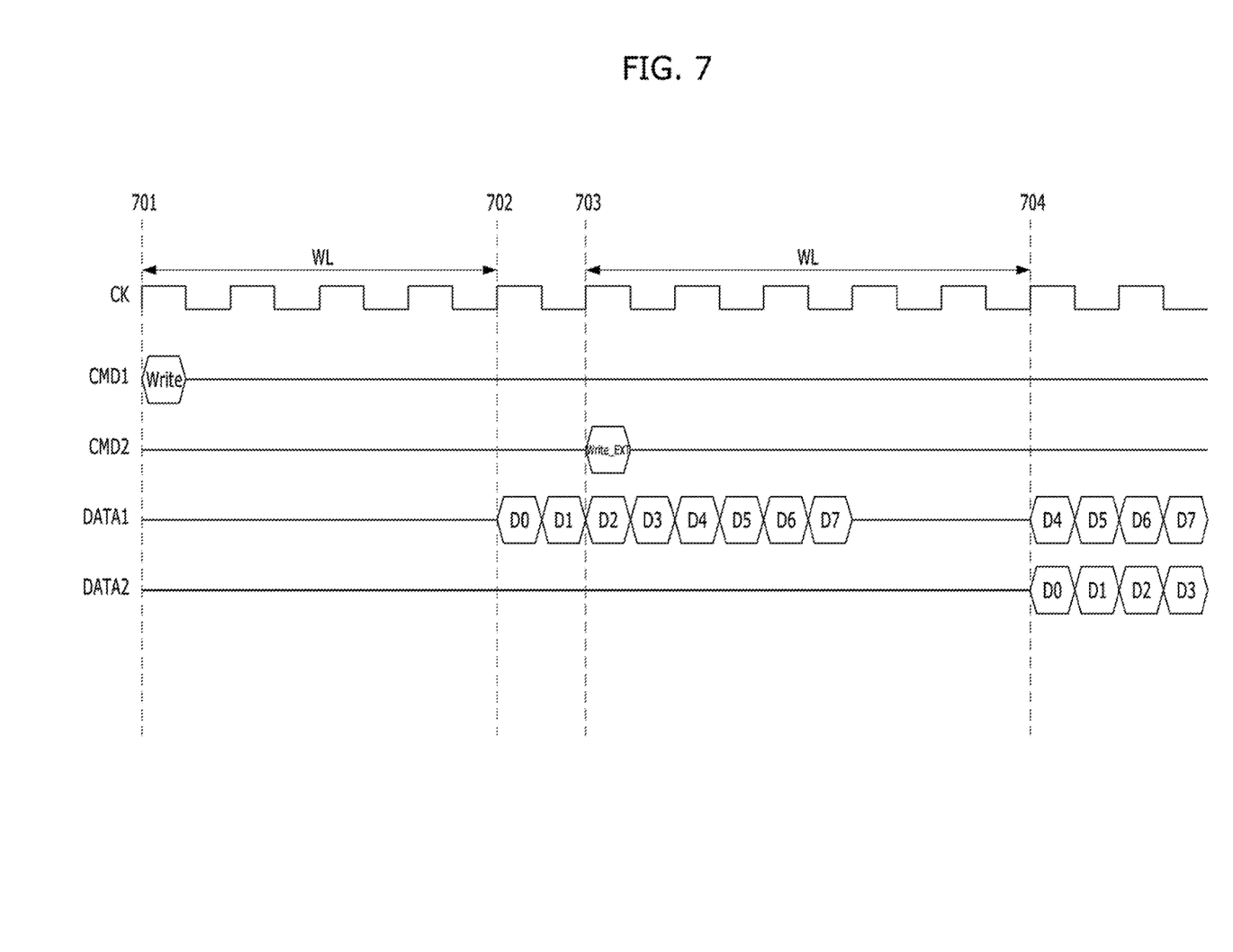
FIG. 7 is a diagram illustrating a write operation of the memory device of FIG. 5.

FIG. 7 is a diagram illustrating the write operation of the memory device 500.

Referring to FIG. 7, at a point in time 701 the write command Write for the first channel may be applied through the first command interface 511_1. Furthermore, at a point in time 702 after a lapse of write latency WL from the point in time 701 data D0~D7 of the write data DATA1 may be inputted from the external device to the memory device 500 through the first data interface 515_1. It may be seen that a cycle of 4 clocks is consumed in inputting the data D0~D7 to be written in the first channel of the memory device 500 since the data D0~D7 is inputted only through the first data interface 515_1.

At a point in time 703, the extra write command Write_EXT for the second channel may be applied through the second command interface 511_2. Furthermore, at a point in time 704 after a lapse of the write latency WL from the point in time 703, data D0~D7 of the write data DATA1 and DATA2 transferred from the external device may be inputted to the memory device 500 through both of the second data interface 515_2 and the first data interface 515_1. It may be seen that a cycle of 2 clocks is consumed in inputting the data D0~D7 written in the second channel of the memory device 500 since the data D0~D7 is inputted through both of the second data interface 515_2 and the first data interface 515_1.

From FIGS. 6 and 7, when the extra read command Read_EXT and the extra write command Write_EXT are applied, it may be seen that the bandwidth of the memory device 500 is increased since data is inputted and outputted through the two data interfaces 515_1 and 515_2 at the same time.

In accordance with the embodiments of the present invention, the bandwidth of the memory device can be increased.

Although various embodiments have been described for illustrative purposes it will be apparent to those skilled in the art that various changes and modifications may be made without departing from the spirit and/or scope of the invention as defined in the following claims.

What is claimed is:

1. A memory device, comprising:
one or more multi-channel memories; and
an interface unit suitable for interfacing with the multi-channel memories, the interface unit comprising:
a first data interface suitable for transferring data for a first channel of the multi-channel memories;
a second data interface suitable for transferring data for a second channel of the multi-channel memories; and
an extra data interface suitable for additionally transferring data for a selected one of the first channel and the second channel.

2. The memory device of claim 1, wherein:
when an extra read command for the first channel is applied, data read from the first channel of the multi-channel memories is output through both of the first data interface and the extra data interface, and
when an extra read command for the second channel is applied, data read from the second channel of the multi-channel memories is output through both of the second data interface and the extra data interface.

3. The memory device of claim 2, wherein:
when the extra read command for the first channel is applied, the data output through the first data interface and the data output through the extra data interface are different, and
when the extra read command for the second channel is applied, the data output through the second data interface and the data output through the extra data interface are different.

4. The memory device of claim 1, wherein:
when an extra write command for the first channel is applied, data inputted through both of the first data interface and the extra data interface is written in the first channel of the multi-channel memories, and
when an extra write command for the second channel is applied, data inputted through both of the second data interface and the extra data interface is written in the second channel of the multi-channel memories.

5. The memory device of claim 4, wherein:
when the extra write command for the first channel is applied, the data inputted through the first data interface and the data inputted through the extra data interface are different, and
when the extra write command for the second channel is applied, the data inputted through the second data interface and the data inputted through the extra data interface are different.

6. The memory device of claim 1, wherein the interface unit further comprises:
a first command interface suitable for receiving a command for the first channel;
a second command interface suitable for receiving a command for the second channel;
a first address interface suitable for receiving an address for the first channel; and
a second address interface suitable for receiving an address for the second channel.

7. The memory device of claim 1, wherein the multi-channel memories are stacked over the interface unit.

8. A memory device, comprising:
one or more multi-channel memories; and
an interface unit suitable for interfacing with the multi-channel memories, the interface unit comprising:
a first data interface; and
a second data interface,
wherein only the first data interface outputs data read from a first channel of the multi-channel memories when a read command for the first channel is applied,
only the second data interface outputs data read from a second channel of the multi-channel memories when a read command for the second channel is applied,
both of the first data interface and the second data interface output data read from the first channel when an extra read command for the first channel is applied, and
both of the first data interface and the second data interface output data read from the second channel when an extra read command for the second channel is applied.

9. The memory device of claim 8, wherein:
when a write command for the first channel is applied, data inputted through only the first data interface is written in the first channel,
when a write command for the second channel is applied, data inputted through only the second data interface is written in the second channel,
when an extra write command for the first channel is applied, data inputted through both of the first data interface and the second data interface is written in the first channel, and
when an extra write command for the second channel is applied, data inputted through both of the first data interface and the second data interface is written in the second channel.

10. The memory device of claim 8, wherein:
when the extra read command for the first channel is applied, the data output through the first data interface and the data output through the second data interface are different, and
when the extra read command for the second channel is applied, the data output through the first data interface and the data output through the second data interface are different.

11. The memory device of claim 9, wherein:
when the extra write command for the first channel is applied, the data inputted through the first data interface and the data inputted through the second data interface are different, and
when the extra write command for the second channel is applied, the data inputted through the first data interface and the data inputted through the second data interface are different.

12. The memory device of claim 8, wherein the interface unit further comprises:
  a first command interface suitable for receiving a command for the first channel;
  a second command interface suitable for receiving a command for the second channel;
  a first address interface suitable for receiving an address for the first channel; and
  a second address interface suitable for receiving an address for the second channel.

13. The memory device of claim 8, wherein the multi-channel memories are stacked over the interface unit.

\* \* \* \* \*